(12) United States Patent
Xu et al.

(10) Patent No.: US 12,068,530 B2
(45) Date of Patent: Aug. 20, 2024

(54) ANTENNA DESIGN FOR ROBUST CROSS-HEAD AND CROSS-BODY LINK

(71) Applicant: Google LLC, Mountain View, CA (US)

(72) Inventors: Nan Xu, Sunnyvale, CA (US); Vijay Asrani, San Jose, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 440 days.

(21) Appl. No.: 17/419,877

(22) PCT Filed: Jul. 15, 2020

(86) PCT No.: PCT/US2020/042094
§ 371 (c)(1),
(2) Date: Jun. 30, 2021

(87) PCT Pub. No.: WO2022/015298
PCT Pub. Date: Jan. 20, 2022

(65) Prior Publication Data
US 2022/0181769 A1    Jun. 9, 2022

(51) Int. Cl.
*H01Q 1/38*      (2006.01)
*H01Q 1/27*      (2006.01)
*H04M 1/72409*    (2021.01)

(52) U.S. Cl.
CPC .............. *H01Q 1/273* (2013.01); *H01Q 1/38* (2013.01); *H04M 1/724097* (2022.02)

(58) Field of Classification Search
CPC .... H01Q 1/273; H01Q 1/38; H04M 1/724097
See application file for complete search history.

(56) References Cited

U.S. PATENT DOCUMENTS 7,724,201 B2    5/2010   Nysen et al.
2006/0132382 A1*   6/2006   Jannard ................ G02C 11/06
                                                                        345/8

(Continued)

FOREIGN PATENT DOCUMENTS

CN        103688407 A     3/2014
CN        208273204 U    12/2018

(Continued)

OTHER PUBLICATIONS

"Foreign Office Action", IN Application No. 202147031377, Aug. 7, 2023, 7 pages.

(Continued)

*Primary Examiner* — Henry Luong
(74) *Attorney, Agent, or Firm* — Colby Nipper PLLC

(57) ABSTRACT

The present disclosure provides a metal structure, or antenna radiator, for an accessory that is configured to function as both an antenna and an input control. The device may be a wearable device with a first surface shaped to be in contact with the human body and a second surface shaped to be exposed when the device is being worn. The antenna radiator may be located internally within the housing of the device and coupled to a printed circuit board ("PCB"). The PCB may be located between the antenna radiator and the surface of the housing such that the PCB may shield the antenna radiator from antenna loss due to the human body. An electric field may extend between the PCB and the antenna radiator. The fringe electric field may improve cross-head and cross-body connectivity between the accessory and another device.

20 Claims, 3 Drawing Sheets

(56) References Cited

U.S. PATENT DOCUMENTS

| | | |
|---|---|---|
| 2009/0168847 A1 | 7/2009 | Tornatta et al. |
| 2012/0162032 A1 | 6/2012 | Yang et al. |
| 2015/0043763 A1* | 2/2015 | Troelsen .............. H04R 25/554 |
| | | 343/718 |
| 2015/0303979 A1 | 10/2015 | Shin et al. |
| 2018/0032166 A1 | 2/2018 | Orihara |
| 2018/0088724 A1 | 3/2018 | Erentok et al. |
| 2018/0248811 A1 | 8/2018 | Di Nallo et al. |
| 2019/0006741 A1* | 1/2019 | Riisberg ............... H04R 1/1091 |
| 2020/0045422 A1 | 2/2020 | Chiang et al. |
| 2020/0091590 A1 | 3/2020 | Su et al. |

FOREIGN PATENT DOCUMENTS

| | | |
|---|---|---|
| CN | 109547885 A | 3/2019 |
| CN | 110798766 A | 2/2020 |
| EP | 2551955 | 1/2013 |
| EP | 3190805 A1 | 7/2017 |
| EP | 3422473 A1 | 1/2019 |
| JP | 2011002947 A | 1/2011 |
| WO | 2018063506 A1 | 4/2018 |

OTHER PUBLICATIONS

"Foreign Office Action", EP Application No. 20750994.4, Jan. 24, 2023, 7 pages.

"International Preliminary Report on Patentability", Application No. PCT/US2020/042094, Jan. 17, 2023, 10 pages.

International Search Report and Written Opinion for International Application No. PCT/US2020/042094 mailed Mar. 19, 2021. 16 pages.

"Foreign Office Action", CN Application No. 202080008763.4, Mar. 19, 2024, 19 pages.

* cited by examiner

ANTENNA DESIGN FOR ROBUST CROSS-HEAD AND CROSS-BODY LINK

CROSS-REFERENCE TO RELATED APPLICATIONS

The present application is a national phase entry under 35 U.S.C. § 371 of International Application No. PCT/US2020/042094, filed Jul. 15, 2020, the entire disclosure of which is incorporated herein by reference.

BACKGROUND

Wearable devices or accessories typically have an antenna that connects the accessory to a host device. In some instances, the antenna may also connect one accessory to another, such as when the accessory is a pair of earbuds. The accessory may also include a touchpad for receiving inputs, such as commands to increase/decrease the playback volume, skip to the next song, answer a phone call, etc. Due to the typical small form factor of wearable devices, the touchpad and the antenna may compete for space within the wearable and may be positioned within close proximity of one another. In some cases, the design may require more space in the accessory, thereby making the accessory larger than necessary. Large accessories may be cumbersome or unconformable to wear and/or carry. Additionally, the close proximity of the antenna and touch input may lead to connectivity issues between accessory and between the accessory and host device.

BRIEF SUMMARY

The present disclosure provides for a wearable electronic device comprising a housing shaped to be worn on a human body, wherein at least one first surface of the housing is shaped to come in contact with the body and at least one second surface of the housing is shaped to be exposed when worn on the body, a printed circuit board ("PCB") located within the housing; and a metal structure located within the housing and configured to be both an antenna and an input control. The metal structure may be located at a distance from the PCB and oriented such that the metal structure is substantially parallel to the PCB. The metal structure may be coupled to the PCB via at least a first coupling. An electric field between the PCB and the metal structure may extend in a direction transverse to a tangent of a longitudinal surface of the human body.

The first coupling may be an antenna feed and a touch sensor input. The wearable device may further include a second coupling configured to be an antenna ground pin or an impedance tuning sub.

The metal structure may be located closer to the at least one second surface of the housing than the at least one first surface of the housing. The metal structure may have a central region and a perimeter, wherein the metal structure curves from the central region towards the PCB at the perimeter. The input control may be a touchpad.

The PCB may be configured to shield the metal structure from the human body. The electric field may be configured to propagate around the human body. When the metal structure receives an input, the metal structure may be configured to detect a change in capacitance. The electronic device may be an earbud.

Another aspect of the disclosure includes a device comprising a printed circuit board ("PCB") and a metal structure configured to be both an antenna and an input control. The metal structure may be located at a distance from the PCB and oriented such that the metal structure is substantially parallel to the PBC. The metal structure may be coupled to the PCB via at least a first coupling such that metal structure is substantially parallel to the PCB. An electric field may extend between the PCB and the metal structure.

DETAILED DESCRIPTION

Figure 1A:
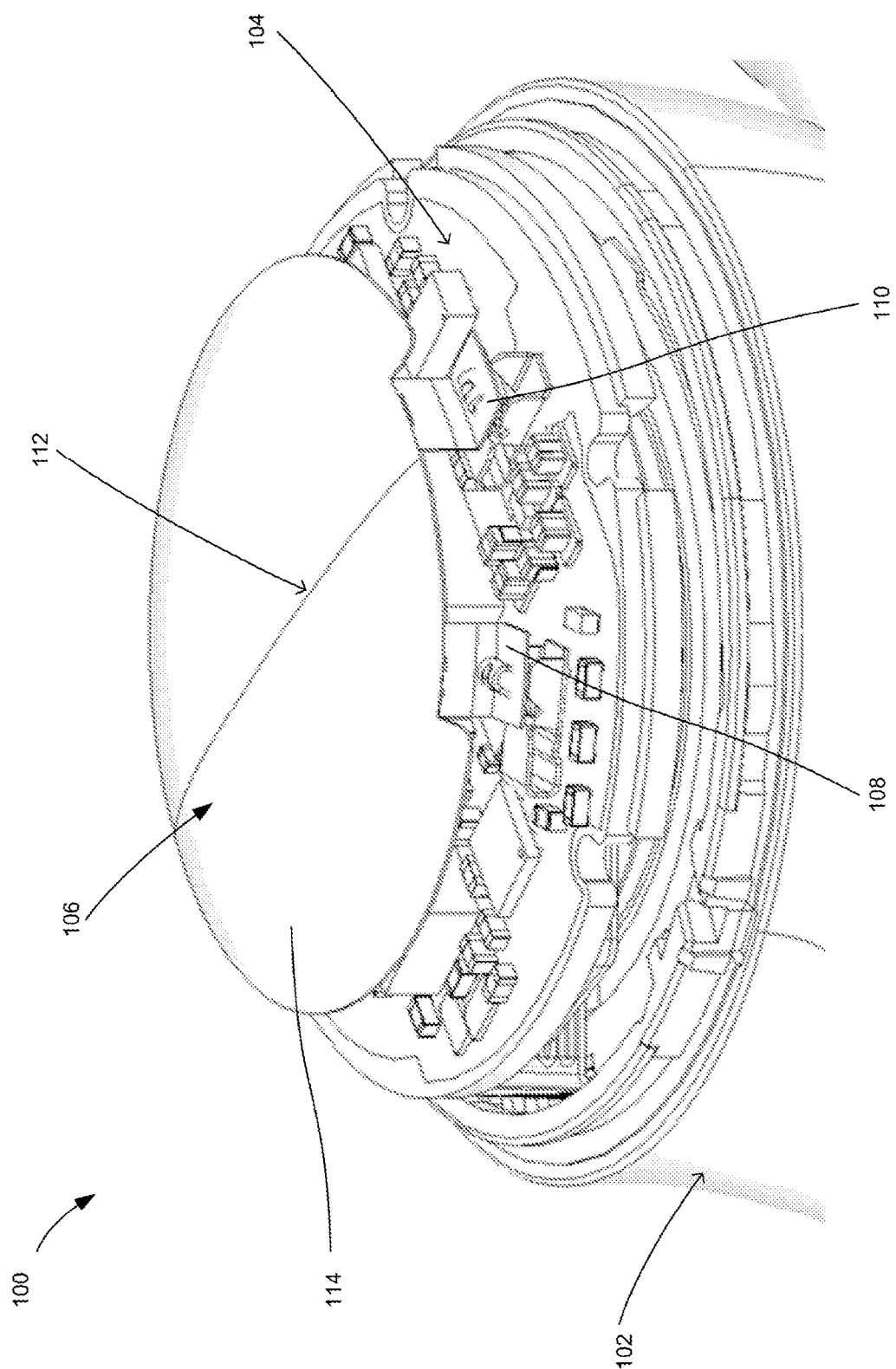
FIG. 1A is a side perspective view of an example accessory according to aspects of the disclosure.

The technology disclosed may generally relate to wearable devices or accessories that connect to a host device. The wearable device may be, for example, one or more earbuds, glasses, virtual reality (VR) headsets, motorcycle helmets, etc. Each accessory may have an antenna that connects the accessory to a host device, such as a smart phone. The antenna may be located within a housing of the accessory. The accessory may also include an input control, such as touchpad or touch input, for receiving user commands. The antenna and touchpad may be combined, or integrated, such that the antenna and touchpad are one component within the housing of the accessory. The combination antenna and touchpad may be, in some examples, referred to as an antenna radiator. The antenna radiator may function as both an antenna and a touchpad as the antenna and the touchpad do not experience cross talk even though they are combined into one element.

By combining the antenna and touchpad into one element, the antenna radiator may be larger within the housing of the accessory than each component would be if they were placed within the housing separately. The combination antenna radiator may eliminate the need to create room for two separate components, i.e. the antenna and the touchpad. Thus, the overall size of the combined antenna and touchpad, or the antenna radiator, may be enlarged within the housing as compared to an accessory that has the antenna and touchpad as two separate components. The physical size of the antenna and touchpad may be directly correlated to the functional performance of wireless radio and the touch sensor. Thus, the increased side may correlate to increased performance. The antenna radiator may, additionally or alternatively, allow for a lower profile of the housing as the housing no longer needs to have room for two separate components. In some examples, the combination antenna radiator may enable both elements, the antenna and touchpad, to be co-located at their most preferred area or location within the device to maximize their respective performance.

The antenna radiator may be coupled to a printed circuit board ("PCB") within the housing of the accessory. The PCB may be located between the housing and antenna radiator such that the PCB may act as a shield to prevent antenna loss. For example, antenna loss may occur when the antenna radiator touches or comes close to touching human body. In particular, the human body acts as a dielectric that may degrade or weaken antenna components. Therefore, by placing the PCB between the housing surface closest to where the accessory would touch the human body and the antenna radiator, the PCB may help prevent the antenna radiator from touching the human body, thereby preventing antenna loss. According to some examples, the antenna radiator may be coupled to the battery or any grounded metal structure within device 100.

The antenna radiator may be coupled to the PCB by one or more contact points. One contact may function as both the feed of an antenna as well as the input of touch sensor. Other contacts may function as antenna grounding or impedance tuning stub that can be totally isolated from touch sensing functionality. According to some examples, the contact points may be one or more spring clips. A first spring clip may function as both an antenna feed and a connection for the input control. A second spring clip may function as an antenna ground.

An electromagnetic field may extend or propagate between and/or around the PCB and the antenna radiator. The electromagnetic field that propagates around the PCB and the antenna radiator, as opposed to propagating directly between the PCB and the antenna radiator, may allow for enhanced coupling between accessories, such as when the accessory is a pair of earbuds. Additionally or alternatively, the electric field that propagates around the PCB and the antenna radiator, also referred to as the fringe electric field, may allow for better coupling between the accessory and the host device.

Figure 1B:
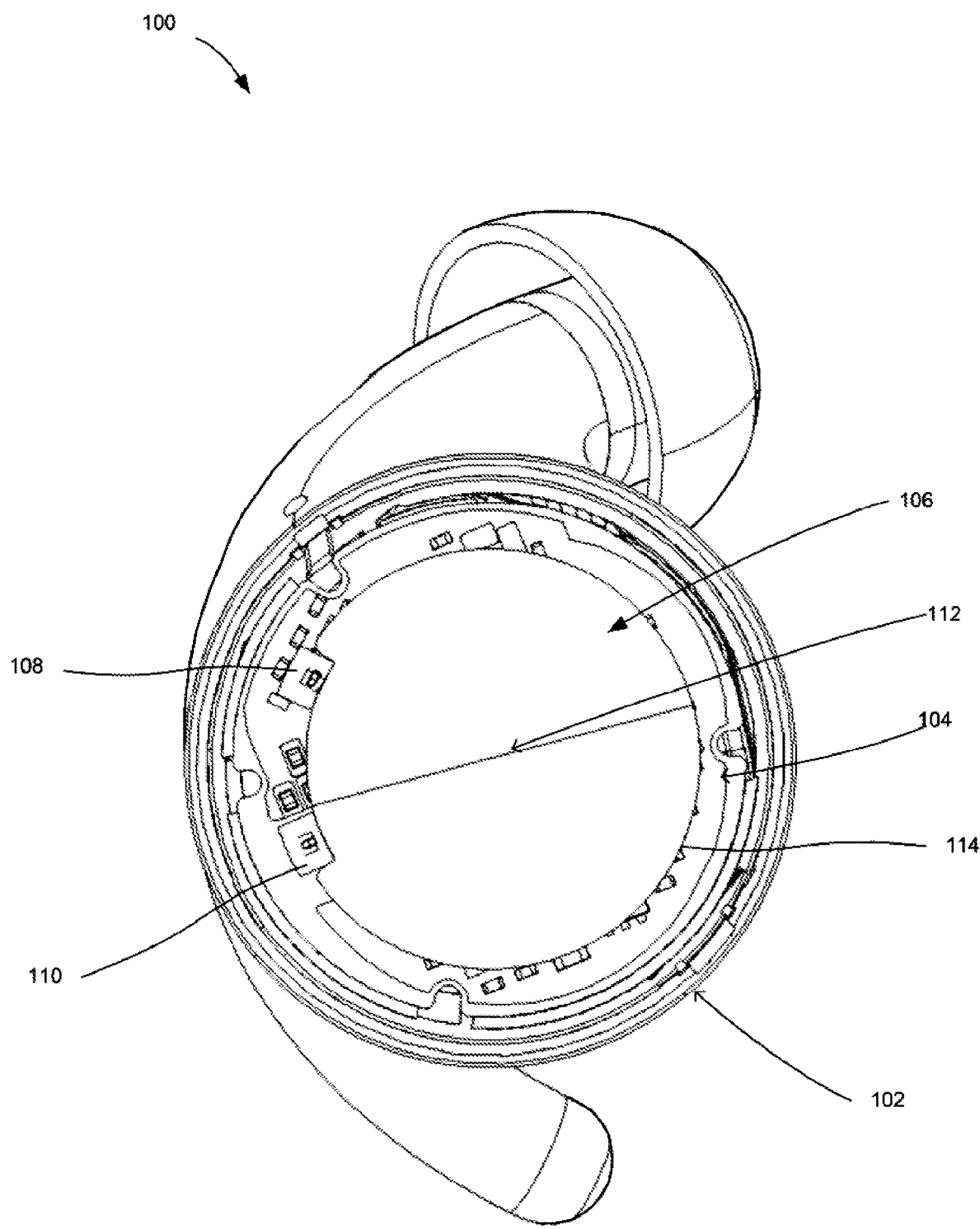
FIG. 1B is a top-down perspective view of the example accessory of FIG. 1A according to aspect of the disclosure.

FIGS. 1A and 1B illustrate different perspective views of an antenna radiator within a housing of an accessory 100. As used herein, an accessory may be used to refer to any electronic device that is coupled to a host device or another accessory and is capable of receiving inputs from a user. Examples of accessories may include earbuds, smartwatches, headsets, other wearable electronics, etc. Accessories may further include other electronic devices, such as a laptop, hub, tablet, etc. The accessory 100 shown in FIGS. 1A and 1B is an earbud, however, this is merely one example and is not intended to be limiting.

Accessory 100 may include a housing 102, a PCB 104, an antenna radiator 106, and spring clips 108, 110. The antenna radiator 106 may be a combined antenna and touchpad. Thus, the antenna radiator 106 may function as both the antenna and the touchpad. Accessory 100 may include additional components, such as one or more processors (e.g., a central processing unit (CPU)), memory (e.g., RAM and internal hard drives) storing data and instructions, a display (e.g., a monitor having a screen, a touchscreen, or other devices such as a smartwatch display that is operable to display information), and user input devices (e.g., a keyboard, touchscreen or microphone).

Housing 102 may be shaped to be worn on a human body. For example, at least one first surface of the housing may be shaped to come in contact with the body and at least one second surface of the housing may be shaped to be exposed when the accessory 100 is worn on the body. The first surface and the second surface may be opposite each other. Housing 102 may house the internal components of accessory 100. For example, within housing 102 may be PCB 104, the antenna radiator 106, spring clips 108, 110, and any additional components, as described above. As shown, a portion of housing 102 is removed such that the internal components of the accessory 100 may be visible.

PCB 104 may be located within housing 102. In some examples, PCB 104 may be located closer to the first surface than the second surface of housing 102. That is, PCB 104 may be located closer to the human body when accessory 100 is being worn as compared to other components.

The positioning of antenna radiator 106 is important as the human body is a dielectric such that the human body may degrade, or weaken, the functioning of antenna components. According to some examples, the antenna radiator 106 may be located within housing 102 between PCB 104 and the second surface of housing 102. That is, the antenna radiator 106 may be located closer to the second surface of housing 102, i.e. the exposed surface of housing 102 when accessory 100 is worn on the body. In such an example, the PCB 104 may shield, or isolate, the antenna radiator 106 from the body such that the antenna radiator 106 experiences less loss effect from the body. Additionally or alternatively, centering the antenna radiator 106 with the PCB 104 and closer to the second surface of housing 102 than the first surface of housing 102 internally within housing 102 may make the antenna radiator 106. Posi therefore, the antenna and touchpad, function more efficiently and less susceptible to wearing conditions, as compared to accessories that have antennas along the perimeter of the housing or those susceptible to placement on the human body.

For example, when accessory 100 is an earbud, as shown, antenna radiator 106 may be located centrally within the housing 102 such that antenna radiator 106 may not come in contact with the human body. In some examples, antenna radiator 106 and, therefore, the antenna and touchpad, may have a maximum amount of clearance from the user's body within the given volume defined by the housing 102 of the device 100. The location of antenna radiator 106 may reduce the dielectric loading effect from the human body and, therefore, may reduce variability due to wearing tolerance and rotation of the accessory.

As shown in FIGS. 1A and 1B, antenna radiator 106 may by a solid structure having a circular shape. The structure may be a metal structure. The shape of the antenna radiator may change based on the shape of the accessory 100 and/or housing 102. Thus, antenna radiator 106 may have a square, rectangular, oblong, etc. shape and having a circular shape, as shown, is merely one example and is not intended to be limiting.

According to some examples, antenna radiator 106 may have portions of the structure cut out. The cut outs may create a pattern in antenna radiator 106. This may create a lighter and/or less expensive antenna radiator 106 without compromising the performance of the antenna radiator 106. Additionally or alternatively, the antenna pattern on antenna radiator 106 may be made in a meshed form. The meshed form may reduce the touch capacitance of the antenna radiator 106 without sacrificing or reducing the antenna radiation performance.

Antenna radiator 106 may have a curvature. For example, antenna radiator may have a central region 112 and a perimeter 114. The antenna radiator 106 may curve from the central region 112 towards the PCB 104 at the perimeter. The curvature of the antenna radiator 106 may be convex. According to some examples, the curvature of antenna radiator 106 may correspond to or substantially follow the curvature of housing 102 of the accessory 100. Thus, in some examples, the antenna radiator 106 may not curve or the antenna radiator 106 may have a concave curvature.

The antenna radiator 106 may be sized such that the perimeter 114 of the antenna radiator 106 is located at a distance from housing 102. That is, antenna radiator 106 may have a size that is smaller than the opening in housing 102 in which the antenna radiator 106 is placed. The size of antenna radiator 106 may reduce false touch by pulling away from the housing 102 of the accessory 100. Additionally or alternatively, the size of antenna radiator 106 may provide minimal, if any, additional protrusion from housing 102. In some examples, the size of antenna radiator 106 may lower the susceptibility to finger gesture of inputs, such as pause, play, etc.

The antenna radiator 106 may be coupled to the PCB 104 via at least one contact point, such as a spring clip 110. According to some examples, there may be two contact points, such as first and second spring clips 108, 110. Thus, the radio-frequency ("RF") circuitry to the antenna and the touch sensor circuitry for the touchpad may both be connected to the antenna radiator 106. This may allow the antenna and touchpad to work independently without having their respective signals cross talking. For example, the antenna RF signal may not impact or interfere with the touch sensor signals and vice versa. The antenna radiator 106 may be coupled to the PCB 104 such that antenna radiator 106 is substantially parallel to the PCB.

A first spring clip 110-may function as both an antenna feed and an input for a touch sensor. The device 100 may include decoupling circuitry to be implemented at spring clip 110 in order to make both the radio system and touch sensor system function properly and independently while sharing the same metal structure 106. Combining the antenna feed with the circuitry for receiving the signal for an input into one spring clip 110, may increase the efficiency of the accessory 100. Moreover, overall manufacturing costs may be reduced as one component, spring clip 108, may have two functions, being the antenna ground and being the circuitry for receiving signals indicating a touch input. A second spring clip 108 may function as an antenna ground pin or impedance tuning sub. A capacitor with calculated capacitance value may be implemented on spring clip 108 to prevent touch input signal being shorted to ground.

Figure 2:
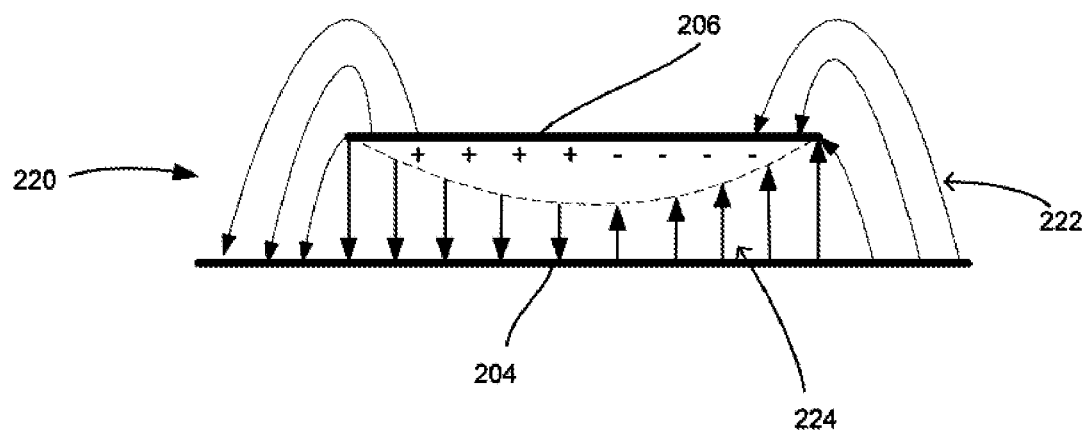
FIG. 2 is an example electric field diagram according to aspect of the disclosure.

FIG. 2 illustrates an example of an electric field extending between the PCB and the antenna radiator. The electric field 220 may extend between PCB 204 and antenna radiator 206. The portion of the electric field that remains between PCB 204 and antenna radiator 206 may be the vertical electric field 224 and the portion of the electric field 220 that extends beyond or outside of the PCB 204 and antenna radiator 206 may be the fringe electric field 222.

The antenna radiator described herein may reduce the electromagnetic field concentration as compared to a traditional monopole antenna. For example, the antenna's opening carries the strongest electric field of an antenna which is responsible for radiation. The antenna's opening of the planar antenna radiator described herein may be wider than the antenna's opening for traditional monopole antenna. This may smooth out the concentration of the electric field of an antenna, and, therefore, help reduce the variation due to the loading effects from the human body tissues, which may be high permittivity materials.

The vertical electric field 224 may extend between PCB 204 and antenna radiator 206. The vertical electric field 224 may maximize the surface wave that propagates along the surface of antenna radiator 206. As the surface wave is maximized, the sensitivity for cross-head and cross-body linkage may increase. Cross-head linkage may occur between two earbuds, such as a right and left earbud. Cross-body linkage may occur between a left and/or right earbud and a host device, such as a smartphone.

The vertical electric field 224 may not be vertical when the accessory is in use. For example, when the accessory is an earbud, the vertical electric field 224 may be perpendicular to the tangential vertical surface of the human body. In particular, the vertical electric field 224 may be perpendicular to the tangential vertical surface of the user's ear or cheek. Thus, the vertical electric field 224 may be horizontal, or at any other angle, when the accessory is being worn.

The fringe electric field 222 may propagate and/or radiate outwardly from the edge of PCB 204 to the edge of antenna radiator 206. As the fringe electric field 222 radiates from the PCB 204 to the antenna radiator 206, the strength of the fringe electric field 222 may decrease as the distance away from the PCB 204 and the antenna radiator 206 increases. The fringe electric field 22 may allow for connectivity and/or increased connectivity between accessories and/or between an accessory and a host device. For example, when the accessory is a pair of earbuds, the fringe electric field 222 from the right earbud may propagate around the user's head and be used to connect the right earbud to the left earbud. Additionally or alternatively, the fringe electric field 222 from the left earbud may propagate around the user's head and be used to connect the left earbud to the right earbud. In some examples, the fringe electric field 222 from the accessory may propagate and be used to connect the accessory to the host device. In such an example, the fringe electric field 222 from a pair of earbuds may propagate around the user and be used to connect to the host device, which may be a smartphone in the user's hands.

Figure 3:
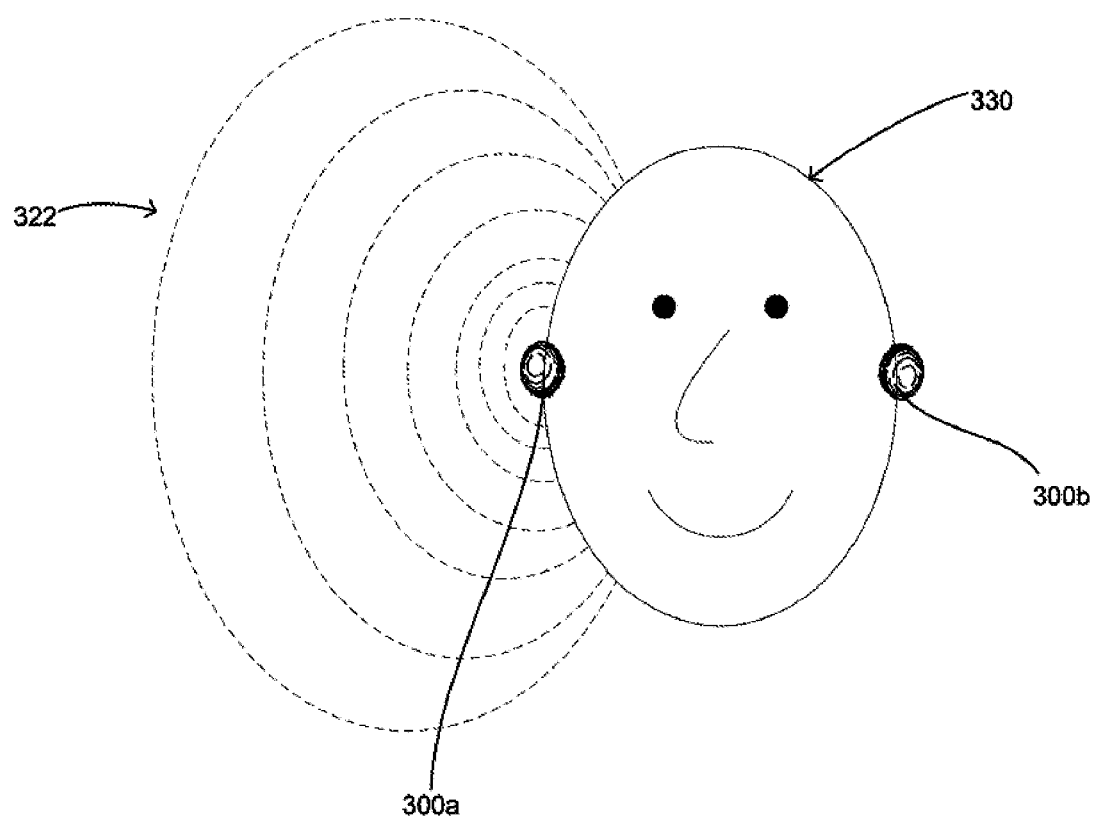
FIG. 3 is a pictorial diagram illustrating an example use of the accessory according to aspects of the disclosure.

FIG. 3 illustrates an example of the fringe electric field propagating around a user's head. The user 330 may be wearing a right and left earbud 300*a*, 300*b*. The fringe electric field 322 of the right earbud 300*a* may propagate around right earbud 300*a* and user 330. While not shown, the left earbud 300*b* may have a fringe electric field propagating around left earbud 300*b* and user 330.

The propagation of fringe electric field 322 may increase the connectivity between the right earbud 300*a* and left earbud 300*b* and/or between the right earbud 300*a* and the host device (not shown). In particular, the propagation of the fringe electric field 322 around the human body and/or across the human body may be stronger at locations further away from the accessory than an electric field from a monopole antenna. The increased strength of the fringe electric field 322 may increase the connectivity for cross-head linkage between right earbud 300*a* and left earbud 300*b* as well as for cross-body linkage between right earbud 300*a* and a host device (not shown).

The size, shape, and placement of the antenna radiator described herein may provide the user a better experience when interacting with the accessory housing the antenna radiator. In particular, by combining the function of the antenna and the touchpad into one element, the overall size of the accessory may decrease and/or there may be few protrusions extending from the accessory as there only needs to be room for one component instead of two. Moreover, by combining the function of the antenna and the touchpad into one element, the antenna radiator, allows for the size of the antenna and touchpad to be increased within the housing of the device. According to some examples, combining the function of the antenna and the touchpad into one element may allow both components to co-locate at their best performance benefitting location. This may improve antenna efficiency by having an increased antenna aperture and/or volume.

The placement of the antenna radiator within the housing of the accessory may reduce the frequency loading effect from the user's body. Moreover, the internal placement of the antenna radiator may reduce the likelihood of the antenna radiator from coming in contact with the human body which may prevent the human body from weakening the antenna components.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements

The invention claimed is:

1. A wearable electronic device, comprising:
a housing shaped to be worn on a human body, wherein at least one first surface of the housing is shaped to come in contact with the human body and at least one second surface of the housing is shaped to be exposed when worn on the body;
a printed circuit board ("PCB") located within the housing; and
a metal structure located within the housing and configured to be both an antenna and an input control,
wherein the input control is a touchpad,
wherein the metal structure is located at a distance from the PCB and oriented such that the metal structure is substantially parallel to the PCB,
wherein the metal structure is coupled to the PCB via at least a first coupling, and
wherein an electric field between the PCB and the metal structure extends in a direction transverse to a tangent of a longitudinal surface of the human body.

2. The wearable electronic device of claim 1, wherein the first coupling is an antenna feed and a touch sensor input.

3. The wearable electronic device of claim 1, further comprising a second coupling configured to be an antenna ground pin or an impedance tuning sub.

4. The wearable electronic device of claim 1, wherein the metal structure is located closer to the at least one second surface of the housing than the at least one first surface of the housing.

5. The wearable electronic device of claim 1, wherein the metal structure has a central region and a perimeter, wherein the metal structure curves from the central region towards the PCB at the perimeter.

6. The wearable electronic device of claim 1, wherein the PCB is configured to shield the metal structure from the human body.

7. The wearable electronic device of claim 1, wherein the electric field is configured to propagate around the human body.

8. The wearable electronic device of claim 1, wherein when the metal structure receives an input, the metal structure is configured to detect a change in capacitance.

9. The wearable electronic device of claim 1, wherein the wearable electronic device is an earbud.

10. The device of claim 9, wherein the electronic device is configured to be worn on a human body.

11. The device of claim 10, wherein the electric field extends in a direction transverse to a tangent of a longitudinal surface of the human body.

12. The device of claim 10, wherein the PCB is configured to shield the metal structure from the human body.

13. The device of claim 10, wherein the electric field is configured to propagate around the human body.

14. The wearable electronic device of claim 1, further comprising one or more processors, the one or more processors configured to wirelessly couple, by the metal structure, to a second wearable electronic device.

15. A device, comprising:
a printed circuit board ("PCB"); and
a metal structure configured to be both an antenna and an input control,
wherein the input control is a touchpad,
wherein the metal structure is located at a distance from the PCB and oriented such that the metal structure is substantially parallel to the PCB,
wherein the metal structure is coupled to the PCB via at least a first coupling such that metal structure is substantially parallel to the PCB, and
wherein an electric field extends between the PCB and the metal structure.

16. The device of claim 15, wherein the first coupling is an antenna feed and a touch sensor input.

17. The device of claim 15, further comprising a second coupling configured to be an antenna pin or an impedance tuning sub.

18. The device of claim 15, wherein the metal structure has a central region and a perimeter, wherein the metal structure curves from the central region towards the PCB at the perimeter.

19. The device of claim 15, wherein when the metal structure receives an input, the metal structure is configured to detect a change in capacitance.

20. The device of claim 15, further comprising one or more processors, the one or more processors configured to wirelessly couple, by the metal structure, to a second device.

* * * * *